G. W. COPELAND.
TACK STRIPS AND REELS.

No. 186,663.   Patented Jan. 30, 1877.

WITNESSES.
Fred. F. Raymond.
Frank G. Parker.

INVENTOR.
Geo. W. Copeland.

UNITED STATES PATENT OFFICE.

GEORGE W. COPELAND, OF MALDEN, MASSACHUSETTS.

IMPROVEMENT IN TACK STRIPS AND REELS.

Specification forming part of Letters Patent No. 186,663, dated January 30, 1877; application filed August 11, 1876.

*To all whom it may concern:*

Be it known that I, GEORGE W. COPELAND, of Malden, in the county of Middlesex and State of Massachusetts, have invented an Improvement in Tack Strips and Reels, of which the following is a specification:

This invention has for its object the following-described tack strip and reel, and is designed more particularly for the purpose of facilitating the feeding of headed tacks to a driving mechanism.

Reference is had to the accompanying drawing, forming a part of this specification, in explaining my invention, in which—

Figure 1:
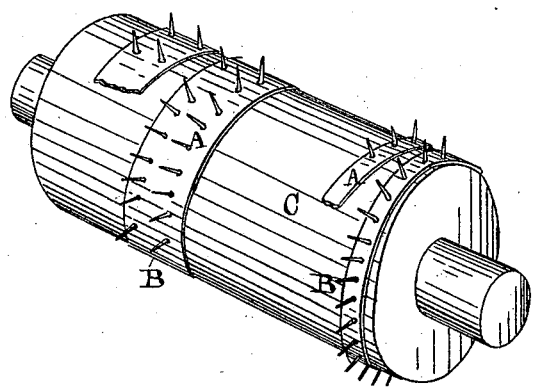
Figure 2:
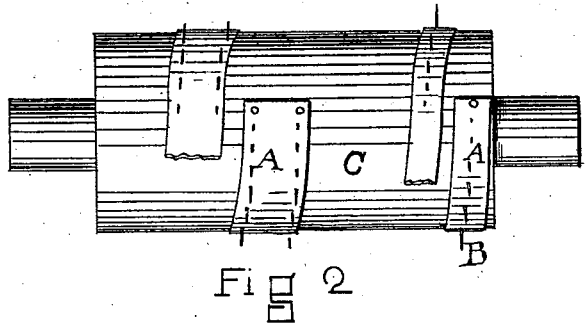
Figure 3:
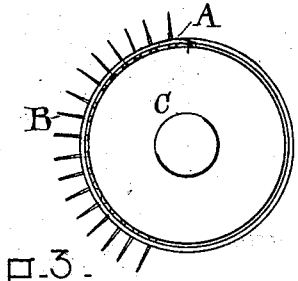
Figure 4:
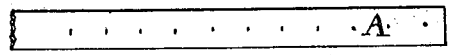
Figure 5:
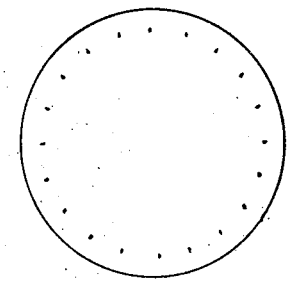

Figure 1 is a perspective view of the roll, with the tack-strip wound upon the same. Fig. 2 is a plan of the same. Fig. 3 is a cross-section. Fig. 4 is a plan of the strip, and Fig. 5 is a modification thereof.

It has long been desirable to provide an efficient means of preparing for the delivery of headed tacks to the machine driving the same; and for this purpose various ways of separating them by hoppers and chutes have been devised, but with comparatively unsuccessful results, owing to their irregular shape.

My invention relates, first, to inserting tacks, with their points in one direction, into a feeding and holding strip of paper or other flexible material, at even and uniform distances apart. This operation may be performed as the tacks are made, substantially as pins are headed and inserted in the paper, or in any desirable way. The feeding-strip carrying the tacks, as above described, and as shown in Figs. 1, 2, and 3, is wound round a reel spirally, as represented in Figs. 2 and 3, and the tacks are fed from the reel C to the driving mechanism with their heads upon a given side of the strip.

By this means of presenting the tacks a regular feed can be assured and a uniformity of result achieved.

Having thus fully described my invention, I claim and desire to secure by Letters Patent of the United States—

1. The flexible carrier A, with tacks B inserted therein, adapted to be used upon a suitable reel, substantially as shown and described.

2. A tack-feeding strip, substantially as described, wound spirally round a delivering-reel, and arranged to feed tacks with their points in one direction, substantially as described.

3. The continuous flexible tack-strip, provided with tacks, substantially as shown and described, and adapted for use, as herein set forth.

GEO. W. COPELAND.

Witnesses:
FREE. F. RAYMOND,
FRANK. G. PARKER.